United States Patent [19]

Takahashi et al.

[11] Patent Number: 4,742,109
[45] Date of Patent: May 3, 1988

[54] POLYBUTYLENE TEREPHTHALATE COMPOSITION

[75] Inventors: Katuhiko Takahashi; Yoshihisa Tajima, both of Fuji, Japan

[73] Assignee: Polyplastics Co., Ltd., Osaka, Japan

[21] Appl. No.: 823,907

[22] Filed: Jan. 30, 1986

[30] Foreign Application Priority Data

Jan. 30, 1985 [JP] Japan .................................. 60-15757

[51] Int. Cl.⁴ ............................................. C08L 67/02
[52] U.S. Cl. .................................... 524/504; 524/513; 525/64; 525/101
[58] Field of Search .................. 525/64, 101; 524/504, 524/513

[56] References Cited

U.S. PATENT DOCUMENTS

| | | | |
|---|---|---|---|
| 4,022,748 | 5/1977 | Schlichting | 525/64 |
| 4,096,207 | 6/1978 | Fornham | 523/201 |
| 4,257,937 | 3/1981 | Cohen | 525/67 |
| 4,267,286 | 5/1981 | Campbell | 525/176 |
| 4,283,326 | 8/1981 | Charles | 525/64 |
| 4,568,712 | 2/1986 | Van Abeelen | 524/267 |

FOREIGN PATENT DOCUMENTS 817475  7/1969  Canada .

OTHER PUBLICATIONS

Titow, W. V., et al., *Reinforced Thermoplastics*, John Wiley & Sons, N.Y., pp. 83–88, 1975.

*Primary Examiner*—Patricia A. Short
*Attorney, Agent, or Firm*—Burns, Doane, Swecker & Mathis

[57] ABSTRACT

A polybutylene terephthalate composition comprises polybutylene terephthalate, polyacrylate and a silane coupling agent and is improved in impact resistance and elongation.

5 Claims, No Drawings

POLYBUTYLENE TEREPHTHALATE COMPOSITION

This invention relates to a polybutylene terephthalate composition having good impact resistance and extensibility.

STATEMENT OF PRIOR ARTS

Polybutylene terephthalate, as on engineering plastic having good mechanical and electrical properties, is widely used for various purposes. Reinforcing fillers are often used with it to give increased strength and rigidity to the molding of the resin. Even if the polybutylene terephthalate is reinforced with a reinforcing filler, however, there may be cases where the molding of the resin has no sufficient impact strength or extensibility. Particularly for the purpose of overcoming the disadvantage of polybutylene terephthalate that it is flammable, it is general practice that various flame retardants are added to provide flame retardance. Generally, however, the addition of flame retardants results in decreased impact strength and extensibility of the molding. With a view to overcoming such difficulty, it has been effectively in practice to add an impact modifier composed of a polyacrylate resin.

SUMMARY OF THE INVENTION

In either of the aforesaid cases, however, impact resistance and extensibility values obtained are not satisfactory enough. It is very important, therefore, to seek further improvement in impact resistance and extensibility. After their extensive research efforts directed to this end, the present inventors found it very effective to add a polyacrylate resin and a silane coupling agent in combination, and on the basis of this finding they arrived at this invention.

The invention provides a polybutylene terephthalate composition which comprises polybutylene terephthalate, polyacrylate and a silane coupling agent. A preferable embodiment of the invention composition comprises 75 to 99.8 wt. % of the polybutylene terephthalate, 0.1 to 20 wt. % of the polyacrylate and 0.1 to 5 wt. % of the silane coupling agent. In another preferred embodiment, the composition comprises 75–99.4 wt. % polybutylene terephthalate, 0.1 to 20 wt. % polyacrylate and 0.5–2.0 wt. % of a silane coupling agent. The invention is defined in other words as a polybutylene terephthalate composition comprising a polybutylene terephthalate resin and, in admixture therewith, an impact property modifier consisting of a polyacrylate resin, and a silane coupling agent. The impact resistance and extensibility of the polybutylene terephthalate resin are thus further improved.

The polybutylene terephthalate resin used in this invention is a polybutylene terephthalate resin known as such, or alternatively it may be a resin composed principally of polybutylene terephthalate, for example, a copolymer or mixture thereof.

The modifier consisting of a polyacrylate resin in the invention is such that the polyacrylate resin contains a unit derived from $C_1 \sim C_6$ alkyl acrylate and that the polyacrylate is composed of a multistage polymer having a rubber-like first stage and a thermoplastic rigid final stage. By way of example, a preferred multistage polymer is one in which the rubber-like first stage is butyl acrylate and the final stage is methyl methacrylate, and in which allyl methacrylate or diallyl maleate is used as a grafting agent. Depending upon the use of styrene polymer may be used as an intermediate layer.

For such multistage polymer having a rubber-like first stage and a thermoplastic rigid final stage, "Acryloid KM330" (U.S. Pat. No. 4,096,202), a product of Rohm & Haas, may be preferably used in the composition of the invention. The amount to be added of such polymer is 0.1~20% by weight relative to the composition as a whole. Any addition in excess of this range is not practicable because it will result in considerable decrease in rigidity, though the impact resistance will be improved. A preferred range of addition is 0.5~10% by weight.

The silane coupling agent added in this invention is expressed by the following general formula:

$$YRSiX_3$$

where X is a hydrolyzable group in bond with silane atoms, being generally chlorine, alkoxy, or acetoxy; Y is an organic functional part, which is a glycidyl group, amino group, or the like; and R is an alkylene group or the like. A preferred example of such silane coupling agent is an amino-silane or epoxy-silane coupling agent. The amount to be added of such agent is 0.1~5% by weight, more preferably 0.5~2% by weight, relative to the composition as a whole.

Silane coupling agents available for the purpose of the invention include, for example, vinyltriethoxysilane, vinyl tris-(2-methoxyethoxy) silane, γ-methacryloxypropyltrimethoxy silane, γ-aminopropyltrimethoxy silane, N-β-(aminoethyl)-γ-amino-propyltrimethoxy silane, β-(3,4-epoxycyclohexyl)ethyltrimethoxy silane, γ-glycidoxypropyltrimethoxy silane, and γ-mercaptopropyltrimethoxy silane. Among these, γ-glycidoxypropyltrimethoxy silane is particularly preferred.

Generally, a silane coupling agent is used as a finishing agent for such inorganic material as glass, and it is known that composites using an inorganic material finished with such agent exhibit higher strength characteristics than those using an inorganic material without such finish; but they are yet unsatisfactory in respect of extensibility and impact resistance. According to this invention, however, an unexpectedly remarkable improvement in impact resistance and extensibility has been achieved by adding to a polybutylene terephthalate a silane coupling agent in combination with a modifier consisting of a polyacrylate resin.

In the composition in accordance with the invention, a reinforcing filler may be incorporated to provide increased strength and rigidity. For the purpose of such reinforcement may be used one or more kinds of fibrous reinforcing fillers including inorganic fibers, such as glass fiber, carbon fiber, graphite fiber, metallic fiber, silicon carbide fiber, asbestos, wollastonite, and fibrous potassium titanate, whisker, and various kinds of organic fibers, and lamellar reinforcing fillers, such as micas (muscovite, phlogopite, sericite, etc.), lamellar glass (glass flake), talc, and metallic foil.

A particularly preferred reinforcing filler is glass fiber, and may be used for addition in the proportion of 1~50% by weight, preferably 5~35% by weight, relative to the composition as a whole.

The composition according to the invention may have a particulate admixture incorporated therein to the extent that such admixture will not adversely affect the molding properties of the composition. The particulate admixture herein refers to glass bead, calcium carbonate, ground quartz, silica, magnesium carbonate, clay, diatomite, alumina, quartz sand, glass power, granular metal, graphite, or the like. These particulate materials may be added in order to reduce the addition of lamellar reinforcing fillers, and/or to impart other functional characteristics to the composition.

Aforesaid varieties of reinforcing fillers and/or admixtures may be used for addition after having been finished with a known finishing agent.

The composition of the invention may have a flame retardant incorporated by addition therein in the proportion of 1~30% by weight, preferably 2~20% by weight, relative to the composition as a whole. The flame retardant herein is any organic halogen compound or phosphorus compound generally used as such; more particularly, aromatic bromine compounds are preferred as such, which include, for example, low molecular weight bromine compounds, such as 5~10 - bromine-substituted compound of diphenyl ether and 5~10 - bromine-substituted aromatic ring hydrogen compound of ethylene glycol diphenylether; bromides of monomers and polymers of aromatic carbonate and epoxy compounds derived from bisphenol A and the like, bromides of polystyrene oligomers, and brominated cyanurate compounds.

In this invention, one or more kinds of aforesaid flame retardants may be used for addition.

In this conjunction, flame retarding assistants—metal oxides and hydroxides, such as antimony trioxide, halogenated antimony, aluminum hydroxide, and magnesium hydroxide—may be used in combination with the flame retardants, whereby much greater flame retarding effects can be obtained.

Generally, the addition of a flame retardant will result in a decrease in impact resistance and extensibility. According to this invention, however, there coexist a modifier consisting of polyacrylate and a silane coupling agent in the composition, so that such adverse effect of the addition can be rectified. More especially, where a flame retardant and a reinforcing filler coexist in the composition of the invention, remarkable improvement can be seen.

It is possible to incorporate by addition into the composition of the invention one or more kinds of known additives, such as for example lubricant, nucleating agent, release agent, antistatic agent, other surface active agent, plasticizer, pigment, dye, heat stabilizer, and ultraviolet stabilizer, in order to impart any desired characteristics depending upon the purpose for which the composition is to be used.

In order to give a further desired characteristic quality to the composition of the invention, it is also possible to add one or more kinds of organopolymeric materials to the composition for admixture or copolymerization therewith. Examples of such materials are vinyl compounds and copolymers thereof, such as polyethylene terephthalate, polycarbonate, low molecular weight polyethylene, polypropylene, polyethylene terephthalate, polyurethane, fluoplastics, ethylene-vinyl acetate copolymer, ethylenealkylacrylate copolymer, styrene-butadieneacrylonitrile copolymer, and styrene-acrylonitrile copolymer; and thermoplastic segment-type copolyesters (above said copolymers include graft copolymers).

The composition according to the invention can easily be prepared in accordance with any of the known methods generally employed in preparing conventional resin compositions. For example, one method is such that individual components are mixed together and the mixture is then kneaded and extruded by means of an extruder into pellets; and subsequently the pellets are molded into shape. Another method is such that pellets of different compositions are first prepared, and the pellets are mixed in predetermined proportions, the mixture being then molded into shape so that a molding of the desired composition is obtained upon completion of the molding process. A further method is such that one or more components are charged directly into a molding machine. Any of these methods may be employed.

[EXAMPLES AND COMPARATIVE EXAMPLES]

The invention will now be explained in further detail on the basis of examples and comparative examples; however, these examples are not to be construed to limit the scope of the invention.

EXAMPLES 1~4

To polybutylene terephthalate were added glass fibers, a modifier consisting of a polyacrylate resin (Acryloid KM 330, produced by Rohm & Haas), brominated polycarbonate as a flame retardant, and a silane coupling agent (A-187, produced by Nihon Unicar Co.) in such proportions as indicated in the appended Table. The mixture was melt kneaded and extruded by means of an extruder, and then the extruded stock was molded into shape by injection molding. Evaluation was made of the molded shape with respect to its extensibility and impact strength. The evaluation results are shown in Table 1.

COMPARATIVE EXAMPLES 1~5

Moldings without addition of a modifier consisting of a polyacrylate resin and(or) a silane coupling agent were evaluated in same manner as in Examples. The results are also shown in Table 1.

TABLE 1

| Component/Property | Unit | Exmp 1 | Exmp 2 | Comp Ex 1 | Comp Ex 2 | Exmp 3 | Comp Ex 3 | Exmp 4 | Comp Ex 4 | Comp Ex 5 |
|---|---|---|---|---|---|---|---|---|---|---|
| Polybutylene terephthalate | wt % | 89 | 88 | 90 | 99 | 69 | 80 | 63 | 64 | 69 |
| Polyacrylate modifier | " | 10 | 10 | 10 | — | 10 | — | 6 | 6 | — |
| Silane coupling agent | " | 1 | 2 | — | 1 | 1 | — | 1 | — | 1 |
| Flame retardant | " | — | — | — | — | — | — | 10 | 10 | 10 |
| Glass fiber (*1) | " | — | — | — | — | 20 | 20 | 20 | 20 | 20 |
| Extensibility | D-638 % | 75 | over 100 | 30 | 20 | 4.5 | 2.5 | 2.8 | 2.3 | 2.3 |
| Izod impact strength (unnotched) | D-638 Kg/cm$^2$ | over 200 | over 200 | over 200 | 50 | 78 | 58 | 76 | 55 | 67 |

(*1) Finishing agent (silane coupling agent A-1100, Nihon Unicar Co.) deposited 0.1%.

[Advantage of the Invention]

As can be appreciated from the evaluation results of Examples and Comparative Examples, the composition in accordance with the invention have excellent characteristics in respect of extensibility and impact strength in particular. Therefore, the composition may be advantageously used in various areas of application, such as connectors, coil bobbins, terminals, and other electrical, electronic, and machinery components, where aforesaid characteristics are particularly required.

The embodiments of the invention in which an exclusive privilege or property is claimed are defined as follows:

1. A polybutylene terephthalate composition which comprises 75–99.4 wt. % polybutylene terephthalate, 0.1 to 20 wt. % polyacrylate and 0.5–2.0 wt. % of a silane coupling agent having the formula:

$$YRSiX_3$$

wherein X is a hydrolyzable group, Y is a glycidyl group or an amino group and R is an alkylene group.

2. A composition as claimed in claim 1, in which the polyacrylate is a multi-stage polymer containing a rubber-like first stage and a thermoplastic rigid final stage.

3. A composition as claimed in claim 1, which further comprises a flame retardant.

4. A composition as claimed in claim 1, which further comprises glass fibers.

5. A composition as claimed in claim 1 wherein said silane coupling agent is mixed throughout said composition.

* * * * *